United States Patent [19]

Armes et al.

[11] Patent Number: 4,959,180
[45] Date of Patent: Sep. 25, 1990

[54] COLLOIDAL POLYANILINE

[75] Inventors: Steven P. Armes, Los Alamos; Mahmoud Aldissi, Santa Fe, both of N. Mex.

[73] Assignee: The United States of America as represented by the United States Department of Energy, Washington, D.C.

[21] Appl. No.: 305,817

[22] Filed: Feb. 3, 1989

[51] Int. Cl.$^5$ .......................... H01B 1/00; H01B 1/06
[52] U.S. Cl. ..................... 252/519; 252/518; 528/422; 524/80; 524/438; 524/251; 524/401
[58] Field of Search ............ 252/500, 518, 519; 204/59 R; 528/422; 524/251, 257, 288, 80, 286, 438

[56] References Cited

U.S. PATENT DOCUMENTS 4,835,076  5/1989  Heinze et al. ............. 252/500
4,880,508  11/1989  Aldissi ..................... 252/500

Primary Examiner—Josephine Barr
Attorney, Agent, or Firm—Bruce H. Cottrell; Paul D. Gaetjens; William R. Moser

[57] ABSTRACT

Processable electrically conductive latex polymer compositions including colloidal particles of an oxidized, polymerized amino-substituted aromatic monomer, a stabilizing effective amount of a random copolymer containing amino-benzene type moieties as side chain constituents, and dopant anions, and a method of preparing such polymer compositions are provided.

12 Claims, No Drawings

COLLOIDAL POLYANILINE

FIELD OF THE INVENTION

The present invention relates to the field of conductive polymers, more particularly to the field of processable conductive polymers. This invention is the result of a contract with the Department of Energy (Contract No. W-7405-ENG-36).

BACKGROUND OF THE INVENTION

Conductive polymers have been widely investigated due to growing interest in their use in, e.g., anti-static coatings, conductive paints, electromagnetic shielding, electrode coatings and the like. Polyaniline is a relatively air-stable conductive polymer which has previously been prepared by oxidative polymerization of aniline monomer in aqueous media by ammonium persulfate or potassium dichromate. The use of doped, i.e., protonated, polyaniline has been limited by its intractability, i.e., it decomposes without melting and is essentially insoluble. Undoped polyaniline has low solubility in polar solvents such as dimethylformamide, dimethyl sulfoxide, n-methylpyrrolidinone, and also in 80 percent by weight formic acid or acetic acid (see Angelopoulos et al., Mol. Cryst. Liq. Cryst., 1988, 160. 151–163). However, the undoped polyaniline is not electrically conductive.

Recently, another conductive polymer, polypyrrole, has been prepared in a colloidal or latex form by the use of water-soluble polymers, such as poly(vinyl alcohol-co-acetate), poly(vinyl pyrrolidone), and methyl cellulose, as polymeric surfactants or steric stabilizers.

Accordingly, it is an object of this invention to provide a processable electrically conductive polymer composition containing a polymerized amino-substituted aromatic monomer such as aniline.

It is a further object of this invention to provide a processable electrically conductive latex polymer composition.

SUMMARY OF THE INVENTION

To achieve the foregoing and other objects, and in accordance with the purposes of the present invention, as embodied and broadly described herein, the present invention provides processable electrically conductive polymer compositions including: colloidal particles of an oxidized, polymerized amino-substituted aromatic monomer; a stabilizing effective amount of a random copolymer containing amino-benzene type moieties as side chain constituents; and dopant anions. In one embodiment of the invention, the processable electrically conductive polymer composition includes: colloidal particles of oxidized, polymerized aniline monomer; a stabilizing effective amount of a random copolymer selected from the group consisting of a copolymer of a 2-, 3- or 4-vinyl pyridine monomer and para-aminostyrene monomer, or a partially esterified copolymer of vinyl alcohol and vinyl acetate, said vinyl copolymer partially esterified with para-aminobenzoate; and dopant anions. The dopant anions comprise chloride ions.

The present invention further provides dispersions of electrically conductive colloidal polymer particles including: a suitable dispersion medium; and, electrically conductive colloidal polymer particles comprising an oxidatively, polymerized amino-substituted aromatic monomer, a stabilizing effective amount of a random copolymer containing amino-benzene type moieties as side chain constituents, and dopant anions.

The present invention still further provides a process of preparing processable electrically conductive polymer compositions by oxidatively polymerizing under mild conditions a polymerizable amino-substituted aromatic monomer in an acidic aqueous reaction medium, the acidic aqueous reaction medium including a suitable oxidant for the aromatic monomer and a stabilizing effective amount of a random copolymer containing amino-benzene type moieties as side chain constituents.

DETAILED DESCRIPTION

The present invention concerns processable electrically conductive polymer compositions and processes of preparing such compositions. An oxidative polymerization reaction is employed in the preparation of the conductive polymers of this invention. Such a reaction can be performed on a variety of oxidatively polymerizable monomers. Suitable oxidatively polymerizable monomers include amino-substituted aromatic monomer compounds, such as aniline and substituted anilines. The substituent groups (other than with amino groups) may include alkyl, aryl, aralkyl, alkaryl, hydroxy, methoxy, chloro, bromo, and nitro groups. The substituent groups can be selected consistent with the desired polymerization conditions and the desired properties of the resultant polymer composition. Aniline is particularly preferred as the amino-substituted aromatic monomer.

By "processable" is meant that the electrically conductive polymer compositions have good film-forming characteristics and can be processed by conventional coating techniques.

The processable electrically conductive polymer compositions include a stabilizing effective amount of a random copolymer containing amino-benzene type moieties as side chain constituents. While not wishing to be bound by any particular theory, it is believed that the random copolymer functions as a steric stabilizer for the conductive polymer, e.g., the polyaniline, formed in the oxidative polymerization process, thereby preventing precipitation and resulting in a colloidal polyaniline composition. It is further believed that the copolymer functions by chemically grafting onto the polyaniline particles. The random copolymers generally contain only a minor fraction or mole percentage of the amino-benzene type moieties, i.e., from about to about 10 mole percent, although inclusion of greater mole percentages may be possible. The random copolymer can be, e.g., a copolymer of a vinyl pyridine and an amino-substituted styrene, preferably para-aminostyrene, or can be a partially esterified vinyl alcohol polymer or a partially esterified copolymer of vinyl alcohol and vinyl acetate, the partial esterification being with para-aminobenzoate.

By "latex" or "colloidal" is meant that the polymer composition forms particles having dimensions of from about 30 to about 500 nanometers which remain relatively uniformly dispersed or suspended throughout the particular dispersion medium.

The ratio of the stabilizing copolymer to the amino-substituted aromatic monomer in the resultant product can vary from about 10/90 to about 25/75 by weight.

The stabilizing effective amount of the random copolymer containing amino-benzene type moieties as side chain constituents in the polymerization reaction medium will vary with the choice of particular stabilizing polymer. Generally, from about 0.4 to about 1.2 g of the copolymer per 100 ml of reaction medium will prevent precipitation of the conductive polymer and yield the colloidal composition. Lesser amounts may not prevent agglomeration, while greater amounts may result in excess copolymer being included in the colloidal particles and adversely affecting conductivity.

The oxidant used in the oxidative polymerization process must be compatible with the random copolymer containing the amino-benzene type moieties as side chain constituents and capable of oxidatively polymerizing the amino-substituted aromatic monomer. By "compatible" is meant that the combination of the oxidant and the stabilizing copolymer does not result in the formation of significant insoluble precipitate within the reaction medium in which the polymerization reaction is conducted. By "significant" is meant that whatever insoluble precipitate forms may be easily filtered off without adversely reducing the yield of conductive polymer composition. Further, the oxidant must be a relatively mild oxidant, i.e., the oxidant must not polymerize the aromatic monomer at a rate whereat precipitation may result even in the presence of the stabilizing copolymer. It may be possible to increase the level of the copolymer to allow stronger oxidants, but this may result in decreased conductivity in the resultant polymer composition due to the additional amount of copolymer. Potassium iodate is a preferred oxidant for the combination of aniline monomer and the like with the amino-benzene type moiety containing copolymers. Other useful oxidants for the present invention may include well-known oxidants for aniline such as ammonium persulfate and ferric chloride depending upon suitability with the particular stabilizing polymer.

The concentration of oxidant in the reaction medium can vary. Generally, the oxidant concentration will be from about 0.01 to 0.1 molar. Preferably, the oxidant concentration is about 0.04 molar.

The reaction medium for the oxidative polymerization reaction is an acidic, aqueous medium. Generally, any strong mineral acid such as hydrochloric acid, sulfuric acid, and nitric acid can be used to provide the acidic medium. However, nitric acid and sulfuric acid are less preferred than hydrochloric acid due to their non-volatility. Hydrochloric acid is the preferred acid and provides a sufficiently acidic medium during the preparation stage while its volatility provides advantages during subsequent processing stages. The concentration of acid in the reaction medium is generally from about 0.5 to about 2.0 molar, more preferably from about 1.0 to about 1.25 molar. At lower concentrations of acid, the reaction rate is generally too low resulting in lower yield, while higher concentrations of acid can result in degradation of the conductive polymer and reduce conductivity.

The reaction medium may also contain organic solvent materials as long as such organic solvent materials are water-miscible and compatible with the oxidant, the stabilizing copolymer and the amino-substituted aromatic monomer. Suitable organic solvent materials may include dimethylformamide, dimethyl sulfoxide, and alcohols such as methanol or ethanol.

The temperature of the reaction medium is typically room temperature, i.e., about 20° C., although the reaction may be conducted at higher or lower temperatures if desired. The choice of temperature can depend upon the solubility of reactants and products at the particular temperature.

As a result of oxidizing the amino-substituted aromatic monomer, e.g., aniline, in a hydrochloric acid medium, chloride ions from the HCl medium are incorporated as dopant anions in the resultant electrically conductive colloidal polymer composition.

After the oxidative polymerization reaction is completed the resultant conductive colloidal polymer particles can be separated from the reaction medium, e.g., by centrifugation and decantation of the liquid. The colloidal conductive particles, e.g., colloidal polyaniline particles, can be redispersed in a dispersion medium such as de-ionized water, or dilute HCl solutions. The redispersion can be accomplished by the use of, e.g., ultrasonics. Generally, the dispersion medium may be any solvent in which the stabilizing copolymer is soluble.

Pressed pellets prepared from the conductive polymer particles have solid-state conductivities as high as from about 0.5 to about 2.0 siemens per centimeter ($Scm^{-1}$), these values despite the presence of the stabilizing copolymer in the conductive composition. Conductivities may be reduced at higher values for the stabilizing copolymer:aromatic monomer ratio.

A surprising feature of those conductive latex polymer compositions including the vinyl pyridine-containing stabilizing random copolymers is that they exhibit a reversible base/acid-induced flocculation-restabilization behavior. That is, the dispersed colloidal conductive polymer particles can be flocculated by addition of sufficient base to result in a pH of greater than about 4 or 5 and then redispersed or restabilized by addition of an acid to shift the pH back to less than about 3 or 4. While not wishing to bound by the present explanation, it is believed that this reversible behavior is related to the pyridine in the stabilizing copolymer. Upon the addition of base, aggregation is believed to result from the deprotonation of the pyridine and a resultant decrease in the solubility of the stabilizing copolymer. Addition of acid, then results in the reprotonation of the pyridine and a resultant increase in the solubility.

Another surprising feature of the conductive latex polymer compositions of the present invention is the morphology of the colloidal particles. The microscopic polyaniline-based particles have a nonspherical "rice-grain" morphology when viewed under a transmission electron microscope. That is, the particles have a length of about 120 nanometers (nm) with a standard deviation of 20% and a width of about 60 nm, or an aspect ratio of about 2:1.

In the preparation of the processable electrically conductive polymer compositions of the present invention, the polymerizable amino-substituted aromatic monomer is added to an acidic aqueous reaction medium containing a suitable oxidant for the amino-substituted aromatic monomer, e.g., potassium iodate, and a stabilizing effective amount of a random copolymer containing amino-benzene type moieties as side chain constituents. The admixture is stirred at room temperature for a sufficient time to complete the reaction and the resultant conductive colloidal polymer particles separated and purified by means well known to those skilled in the art.

The present invention is more particularly described in the following examples which are intended as illustrative only, since numerous modifications and variations will be apparent to those skilled in the art.

EXAMPLE A

A copolymer of 4-vinyl pyridine and para-aminostyrene was prepared under an inert atmosphere as follows: A reaction vessel equipped with heating means and stirring means was charged with 150 milliliters (ml) of ethanol and heated to reflux (about 60° C.) Para-aminostyrene (3.0 ml) and 4-vinyl pyridine (30.0 ml) were quickly added to the refluxing solvent, followed by addition of 0.15 gram (g) of 2,2'-azobisisobutyrolnitrile (AIBN) to the admixture. The admixture was then refluxed at about 70° C. with stirring for 49 hours. The resultant copolymer was precipitated by addition of excess n-hexane. The solvents were poured off, the precipitate dissolved in methanol, and reprecipitated by addition of water. Purification was completed by repeated dissolving in 1,4-dioxan, followed by addition of water to reprecipitate. The resultant polymer had a viscosity average molecular weight of about 105,000 and contained from about 5 to about 6 mole percent amino-benzene type moieties as determined by NMR.

EXAMPLE B

A copolymer of 2-vinyl pyridine and para-aminostyrene was prepared in a similar manner to example A. The resultant polymer had a weight average molecular weight of about 77,000 as determined by gel permeation chromatography (GPC).

EXAMPLE C

A copolymer of 2-vinyl pyridine and para-aminostyrene was prepared in a similar manner to example A with the exception that toluene was used instead of ethanol and only 2.80 ml of para-aminostyrene was used. The resultant product was purified by allowing the toluene to evaporate, redissolving the precipitate in dioxin and reprecipitating with water. The resultant polymer had a number average molecular weight of about 21,500 and a weight average molecular weight of about 54,000 as determined by GPC.

EXAMPLE D

A modified polyvinyl alcohol was prepared as follows: A copolymer (20.00 g) of vinyl alcohol (88%) and vinyl acetate (12%) having an average molecular weight of about 125,000 (available from Aldrich) was dissolved in 300 ml of dimethyl formamide and heated to about 130° C. To this admixture was added first 2.5 ml of triethylamine, followed by 3.01 g of 4-nitrobenzoyl chloride. This admixture was heated for about 19 hours. About 16 ml of phenylhydrazine was then added dropwise to the reaction solution and the solution maintained at 130° C. for 21 hours. The resultant product was twice precipitated in a dimethyl formamide/acetone mixture, redissolved in water and finally reprecipitated in tetrahydrofuran. The purified product had a weight average molecular weight of about 40,000 as determined by GPC and contained from about 1 to about 2 mole percent amino-benzene type moieties as determined by NMR.

EXAMPLE E

Another modified polyvinyl alcohol was prepared similarly to that of example D with the following changes in amounts: 10 g of the vinyl alcohol copolymer; 1.5 g of 4-nitrobenzoyl chloride; 8 ml of phenylhydrazine; and no triethylamine.

EXAMPLE 1

A reaction vessel was charged with 100 ml of 1.25 molar hydrochloric acid, 0.50 g of the copolymer from example A, and 0.90 g of potassium iodate. The admixture was stirred at room temperature as 1.00 ml of aniline was added. Stirring was continued for about 44 hours. The resultant admixture was centrifuged at 10,000 rpm to separate the colloidal polymer particles. A pressed pellet of the dried particles had a conductivity of about 0.5 siemens per centimeter ($Scm^{-1}$). Analysis of the colloidal polymer particles gave the following composition: %C, 46.80; %H, 4.82; %N, 8.31; %Cl, 13.06; %0, 10.30; and %1, 14.60. While not completely understood, the presence of the iodine may be explained in a variety of ways. The iodine may be present as iodide ions and be a codopant anion with the chloride anions. Alternatively, the iodine may be substituted on the aniline ring, complexed with the aniline ring, complexed with the pyridine group, or encapsulated within the stabilizing polymer.

EXAMPLE 2

A reaction vessel was charged with 100 ml of 1.25 molar hydrochloric acid, 0.50 g of the copolymer of Example B, and 0.90 g of potassium iodate. The admixture was stirred at room temperature as 1.00 ml of aniline was added. Stirring was continued for about 72 hours. The resultant dark-green colloid was centrifuged to separate the colloidal particles. Analysis of the colloidal polymer particles gave the following composition: %C, 45.55; %H, 4.50; %N, 7.88; %Cl, 10.10, %O, 9.58; and %I, 20.60. As in Example 1, the presence of the iodine may be explained in a number of ways.

EXAMPLE 3

Two additional runs in the manner of example 1 were completed using (a) 0.51 g of the copolymer from example E and (b) 1.00 g of the copolymer of example C respectively. The resultant colloidal product of run (a) was centrifuged at 4,500 rpm for 60 minutes and then redispersed by ultrasonics in water. The dispersion was then spread onto a substrate and allowed to dry 25° C. overnight under ambient conditions. The resultant film exhibited a conductivity of about 2.0 $Scm^{-1}$. The product of run (b) was also a colloidal dispersion.

EXAMPLE 4

A reaction vessel was charged with 100 ml of 1.25 molar hydrochloric acid, 0.75 g of the copolymer of Example D, and 0.90 g of potassium iodate. The admixture was stirred at room temperature as 1.00 ml of aniline was added. Stirring was continued for about 91 hours, followed by centrifuging to remove the bulk of the liquids. The resultant polymer composition was redispersed in water and filtered to remove minor insoluble material. This dispersion was used to successfully cast conductive polymeric films onto plastic substates.

The results of the present examples demonstrate that a processable conductive colloidal polymer composition can be prepared by utilizing appropriate stabilizing polymers such as the random copolymer of vinyl pyridine and para-animostyrene and poly(vinyl alcohol-co-vinyl acetate-co-vinyl para aminobenzoate).

Although the present invention has been described with reference to specific details, it is not intended that such details should be regarded as limitations upon the scope of the invention, except as and to the extent that they are included in the accompanying claims.

What is claimed is:

1. A processable, electrically conductive polymer composition comprising:
    colloidal particles of an oxidized, polymerized amino-substituted aromatic monomer selected from the group consisting of aniline or substituted anilines;
    a stabilizing effective amount of a random copolymer containing amino-benzene moieties as said chain substitutents said amount effective to prevent precipitation of said electrically conductive polymer composition; and
    dopant anions.

2. The composition of claim 1 wherein the amino-substituted monomer is aniline.

3. The composition of claim 1 wherein the stabilizing copolymer is selected from the group consisting of poly(2-vinyl pyridine-co-para-aminostyrene), poly(3-vinyl pyridine-co-para-aminostyrene), poly(4-vinyl pyridine-co-para-aminostyrene), and poly(vinyl alcohol-co-vinyl acetate-co-vinyl para-aminobenzoate).

4. The composition of claim 1 wherein the dopant anions are chloride ions.

5. The composition of claim 1 further comprising a dispersion medium.

6. A dispersion of electrically conductive particles comprising:
    a dispersion medium; and
    electrically conductive colloidal particles of an oxidatively, polymerized amino-substituted aromatic monomer selected from the group consisting of aniline or substituted anilines, a stabilizing effective amount of a random copolymer containing amino-benzene moieties as side chain constituents said amount effective to prevent precipitation of said electrically conductive colloidal particles, and dopant anions.

7. The dispersion of claim 6 wherein the dispersion medium is water.

8. The dispersion of claim 6 wherein the dopant anions are chloride ions.

9. A process of preparing a processable electrically conductive polymer composition comprising;
    oxidatively polymerizing under mild conditions a polymerizable amino-substituted aromatic monomer selected from the group consisting of aniline or substituted anilines in an acidic aqueous reaction medium, the acidic aqueous reaction medium including a oxidant for the aromatic monomer and a stabilizing effective amount of a random copolymer containing amino-benzene moieties as side chain constituents said amount effective to prevent precipitation of said electrically conductive polymer composition, said mild conditions being conditions whereas the oxidant does not polymerize the monomer at a rate whereas precipitation occurs in the presence of the stabilizing effective amount of random copolymer.

10. The process of claim 9 wherein the oxidant is potassium iodate.

11. The process of claim 9 wherein the copolymer is selected from the group consisting of poly(2-vinyl pyridine-co-para-aminostyrene), poly(3-vinyl pyridine-co-para-aminostyrene), poly(4-vinyl pyridine-co-para-aminostyrene), and poly(vinyl alcohol-co-vinyl acetate-co-vinyl para-aminobenzoate).

12. The process of claim 9 wherein the amino-substituted aromatic monomer is aniline.

* * * * *